United States Patent [19]

Iwasawa et al.

[11] Patent Number: 4,927,884
[45] Date of Patent: May 22, 1990

[54] CURABLE COMPOSITION

[75] Inventors: Naozumi Iwasawa, Hiratsuka; Osamu Isozaki, Yokohama; Noboru Nakai, Hiratsuka, all of Japan

[73] Assignee: Kansai Paint Co., Limited, Amagasaki, Japan

[21] Appl. No.: 269,084

[22] Filed: Nov. 9, 1988

[30] Foreign Application Priority Data

Nov. 12, 1987 [JP] Japan ................................ 62-285859
Nov. 12, 1987 [JP] Japan ................................ 62-287106

[51] Int. Cl.$^5$ ............................................. C08F 8/00
[52] U.S. Cl. ..................................... 525/195; 525/208
[58] Field of Search ................................ 525/195, 208

[56] References Cited

U.S. PATENT DOCUMENTS 4,818,790 4/1989 Ooka et al. ........................... 525/208

FOREIGN PATENT DOCUMENTS 0067553 9/1983 Japan .

Primary Examiner—Joseph L. Schofer
Assistant Examiner—Alex H. Walker
Attorney, Agent, or Firm—Armstrong, Nikaido, Marmelstein, Kubovcik & Murray

[57] ABSTRACT

Disclosed is a curable composition characterized in that the composition comprises:

(i) 100 parts by weight of a polymer mixture of
  (a) about 5 to about 95% by weight of a polymer (X) containing a specific polysiloxane macromonomer as an essential monomer or a polymer (Y) containing a specific alkoxysilane-containing vinyl monomer as an essential monomer, and
  (b) about 95 to about 5% by weight of a polymer (Z) containing an epoxy-containing vinyl monomer as an essential monomer; and (ii) about 0.01 to about 30 parts by weight of at least one chelate compound selected from the group consisting of aluminum chelate compound, titanium chelate compound and zirconium chelate compound.

13 Claims, No Drawings

CURABLE COMPOSITION

The present invention relates to curable compositions.

For energy cost reductions, it has been highly desired to develop resin compositions which are curable at low temperatures.

Heretofore chiefly used as low-temperature curable resin compositions are two-package resin compositions such as polyol/isocyanate, epoxy/polyamine and like compositions. These two-package resin compositions are cumbersome to handle since the components of the composition are separately stored in two packages and mixed together immediately before use. Moreover, those comprising an isocyanate have the drawback of being highly toxic.

On the other hand, single-package resin compositions are known which are curable at low temperatures. Unexamined Japanese Patent Publication No.67553/1985, for example, discloses a composition comprising aluminum chelate compound and a vinyl polymer containing as a monomer component an alkoxysilane compound such as methacryloxypropyltrimethoxysilane. With this composition, the silanol group resulting from the hydrolysis of the alkoxysilane group primarily serves as a crosslinking functional group, so that there arises a need to use a large quantity of water for the hydrolysis of alkoxysilane groups if it is desired to obtain a cured product with sufficient hardness. Consequently, the hydrolysis produces large quantities of alcohol, etc. as by-products, which render the cured product rough-surfaced, hence impaired surface smoothness. Further when to be cured only with the water in air, this composition requires a prolonged period of time for curing and encounters difficulty in completely curing in the interior of the composition since curing proceeds from the surface, exhibiting lower hardness. Another problem will then be experienced in that the cured product is prone to shrinkage and inferior in surface smoothness.

Polymerizable unsaturated resin compositions of the single-package type are also known which are curable with the active energy of ultraviolet rays, electron rays or the like. These compositions have the drawback of necessitating an irradiation device.

An object of the present invention is to provide a single-package resin composition which is readily curable by crosslinking at a low temperature when merely allowed to stand in air and which is easy to handle.

Another object of the invention is to provide a resin composition which is curable with lesser quantities of by-products to give a cured product of satisfactory properties.

Still another object of the invention is to provide a resin composition which is curable generally uniformly with a reduced difference between the surface and the interior when applied, giving a cured product having sufficient hardness and yet almost free of shrinkage.

These and other objects and features of the invention will become apparent from the following description.

The present invention provides a curable composition characterized in that the composition comprises:
(i) 100 parts by weight of a polymer mixture of
  (a) about 5 to about 95% by weight of a polymer (X) containing a polysiloxane macromonomer as an essential monomer or a polymer (Y) containing an alkoxysilane-containing vinyl monomer as an essential monomer, and
  (b) about 95 to about 5% by weight of a polymer (Z) containing an epoxy-containing vinyl monomer as an essential monomer,
  the polysiloxane macromonomer being prepared by reacting about 70 to about 99.999 mole % of a compound (A) represented by the formula

wherein $R_1$ is an aliphatic hydrocarbon group having 1 to 8 carbon atoms or phenyl, and $R_2$, $R_3$ and $R_4$ are each alkoxyl having 1 to 4 carbon atoms or hydroxyl with about 30 to about 0.001 mole % of a compound (B) represented by the formula

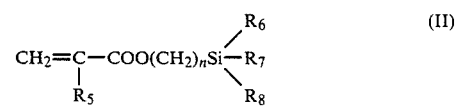

wherein $R_5$ is a hydrogen atom or methyl, $R_6$, $R_7$ and $R_8$ are each hydroxyl, alkoxyl having 1 to 4 carbon atoms or an aliphatic hydrocarbon group having 1 to 8 carbon atoms, at least one of $R_6$, $R_7$ and $R_8$ being hydroxyl or alkoxyl, and n is an integer of 1 to 6, the polysiloxane macromonomer having per molecule at least two functional groups selected from hydroxyl and alkoxyl and being about 400 to about 100000 in number average molecular weight, the alkoxysilane-containing vinyl monomer being represented by the formula

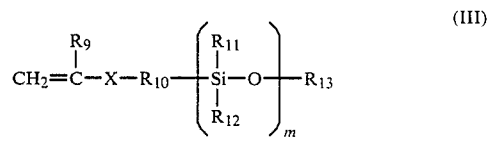

wherein X is

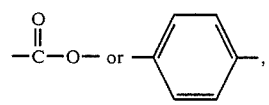

$R_9$ is a hydrogen atom or methyl, $R_{10}$ is a bivalent saturated aliphatic hydrocarbon group having 1 to 6 carbon atoms, $R_{11}$ and $R_{12}$ are the same or different and are each phenyl, alkyl having 1 to 6 carbon atoms or alkoxyl having 1 to 6 carbon atoms, $R_{13}$ is alkyl having 1 to 6 carbon atoms, and m is an integer of from 1 to 10; and (ii) about 0.01 to about 30 parts by weight of at least one chelate compound selected from the group consisting of aluminum chelate compound, titanium chelate compound and zirconium chelate compound.

In the curable composition of the present invention, the epoxy group derived from the polymer (Z) and the silanol group derived from the polymer (X) or the polymer (Y) act as the main crosslinking functional groups. When the polymer (X) or the polymer (Y) has alkoxyl group, the alkoxyl group forms silanol when hydrolyzed with the water in air. The silanol group then serves as a crosslinking functional group.

In the present composition having such crosslinking functional groups, there concurrently occur various curing reactions given below.

(A) Condensation between silanol groups.
(B) Condensation of silanol groups with hydroxyl groups produced from epoxy groups.
(C) Addition of silanol groups to epoxy groups.
(D) Addition of hydroxyl groups to epoxy groups.
(E) Ion polymerization of epoxy groups.

Consequently, low temperatures of room temperature to about 100° C. readily permit crosslinking curing, also effecting various curing reactions almost at the same time, so that the composition is curable with a diminished difference in the degree of curing between the surface and the interior. The cured product therefore has sufficient hardness and high surface smoothness almost without shrinkage. When the resin components are free from hydroxyl, curing reactions wherein silanol groups participate will not readily occur inside the resin composition, whereas curing reactions in which epoxy groups participate take place to effectively cure the interior portion.

Since the resin components contain no alkoxyl group or a relatively small proportion of alkoxyl groups, the curing reactions produce reduced amounts of by-products such as alcohol, with the result that the cured product exhibits satisfactory properties in respect of flexural strength, bond strength, etc. Since the vaporization of solvent starts curing the present composition, the composition can be stored for a prolonged period of time with good stability when sealed off.

The present composition comprises as a resin component a polymer mixture of a polymer (X) containing a polysiloxane macromonomer as a monomer component or a polymer (Y) containing an alkoxysilane-containing vinyl monomer as a monomer component with a polymer (Z) containing an epoxy-containing vinyl monomer as a monomer component.

The polymer (X) is a homopolymer of the polysiloxane macromonomer or a copolymer of the polysiloxane macromonomer with other α,β-ethylenically unsaturated monomer. This macromonomer has the main skeleton of siloxane bond having an aliphatic hydrocarbon group, phenyl, hydroxyl, alkoxyl, polymerizable unsaturated bond, etc. directly or indirectly attached to Si of the main skeleton. The macromonomer can be obtained by reacting a compound (A) represented by the formula

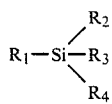

(I)

wherein $R_1$, $R_2$, $R_3$ and $R_4$ are as defined above with a compound (B) represented by the formula

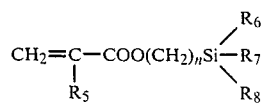

(II)

wherein $R_5$, $R_6$, $R_7$, $R_8$ and n are as defined above.

In the above formula (I) representing the compound (A), $R_1$ is an aliphatic hydrocarbon group having 1 to 8 carbon atoms or phenyl, and $R_2$, $R_3$ and $R_4$ are each alkoxyl having 1 to 4 carbon atoms or hydroxyl. $R_2$, $R_3$ and $R_4$ may all be the same or different, or at least one of them may be different from the others.

In the compound (A), examples of alkoxyl groups having 1 to 4 carbon atoms are straight-chain or branched groups such as methoxy, ethoxy, propoxy, butoxy and the like. Examples of aliphatic hydrocarbon groups having 1 to 8 carbon atoms are methyl, ethyl, propyl, butyl, pentyl, hexyl, heptyl, octyl and the like which are straight-chain or branched groups.

Methyl and phenyl are especially desirable as $R_1$ in the compound (A). Preferable as $R_2$, $R_3$ and $R_4$ are methoxy, ethoxy, propoxy, butoxy and hydroxyl. Examples of preferred compounds (A) are methyltrimethoxysilane, phenyltrimethoxysilane, butyltrimethoxysilane, methyltriethoxysilane, methyltributoxysilane, phenyltrisilanol, methyltrisilanol and the like, among which methyltrimethoxysilane, phenyltrimethoxysilane and phenyltrisilanol are especially desirable. These compounds can be used singly or in combination.

In the above compound, (B), $R_5$ represents a hydrogen atom or methyl, and $R_6$, $R_7$ and $R_8$ are each hydroxyl, alkoxyl having 1 to 4 carbon atoms or an aliphatic hydrocarbon group having 1 to 8 carbon atoms. n is an integer of 1 to 6. $R_6$, $R_7$ and $R_8$ may all be the same or different, or at least one of them may be different from the others. However, at least one of them is hydroxyl or alkoxyl.

In the compound (B), examples of aliphatic hydrocarbon groups having 1 to 8 carbon atoms, as well as alkoxyl groups having 1 to 4 carbon atoms, can be those exemplified for the compound (A). Methoxy, ethoxy and hydroxyl groups are especially desirable as $R_6$, $R_7$ and $R_8$, and n is preferably in the range of from 2 to 4. Examples of preferable compounds (B are γ-methacryloxypropyltrimethoxysilane, γ-methacryloxypropyltriethoxysilane, γ-acryloxypropyltrimethoxysilane, γ-methacryloxybutyltriethoxysilane, γ-acryloxypropyltrisilanol and the like. More preferable among these examples are γ-methacryloxypropyltrimethoxysilane, γ-methacryloxypropyltriethoxysilane compounds can be used singly or in combination.

According to the present invention, the polysiloxane macromonomer can be prepared by reacting the compound (A) with the compound (B). The proportions of the two compounds, based on the combined amount thereof, are about 70 to about 99.999 mole %, preferably about 90 to about 99.9 mole %, more preferably about 95 to about 99 mole %, of the compound (A), and about 30 to about 0.001 mole %, preferably about 10 to about 0.1 mole %, more preferably about 5 to about 1 mole %, of the compound (B). If the amount of the compound (A) is less than about 70 mole %, the mixture is liable to gel during the copolymerization reaction, whereas if it is larger than about 99.999 mole %, the amount of uncopolymerized polysiloxane increases to render the resin solution turbid, hence undesirable.

The reaction between the compounds (A) and (B) is effected by the dehydration condensation of the hydroxyl groups contained in these compounds and/or the hydroxyl groups resulting from the hydrolysis of the alkoxyl groups of the compounds. Depending on the reaction conditions, the reaction involves dealcoholization condensation in addition to the dehydration reaction.

Although the reaction can be carried out in the absence of solvent, it is desirable to conduct the reaction in water and/or an organic solvent wherein both the compounds (A) and (B) are soluble. Examples of desirable organic solvents are hydrocarbon solvents such as heptane, toluene, xylene, octane and mineral spirit, ester solvents such as ethyl acetate, n-butyl acetate, isobutyl acetate, methyl cellosolve acetate and butylcarbitol acetate, ketone solvents such as methyl ethyl ketone, methyl isobutyl ketone and diisobutyl ketone, alcoholic solvents such as ethanol, isopropanol, n-butanol, sec-butanol and isobutanol, ether solvents such as n-butyl ether, dioxane, ethylene glycol monomethyl ether and ethylene glycol monoethyl ether, and the like. These solvents are usable singly or in combination.

When the compounds (A) and (B) are used in the form of a solution, the combined concentration of these compounds in the solution is suitably at least 5 wt. %.

According to the invention, the compounds (A) and (B) are reacted suitably at a temperature of about 20 to about 180° C., preferably about 50° to about 120° C. The reaction time is suitably about 1 to about 40 hours usually.

When required, the reaction may be carried out in the presence of a polymerization inhibitor, which is effective for preventing the polymerization reaction due to unsaturated bonds in the compound (B). Examples of useful inhibitors are hydroquinone, hydroquinone monomethyl ether and like quinone compounds.

The reaction system of compounds (A) and (B) for preparing the polysiloxane macromonomer may have incorporated therein tetraalkoxysilane, dialkyldialkoxysilane or the like, which can be used in an amount of up to about 20 mole % based on the combined amount of the compounds (A) and (B).

When $R_2$, $R_3$, $R_4$, $R_6$, $R_7$ and $R_8$ in the compounds (A) and (B) are all hydroxyl, it is desirable to conduct the reaction in an organic solvent with heating and stirring for dehydration condensation.

Further when at least one of the compounds (A) and (B) has alkoxyl attached to Si, it is desired to effect hydrolysis before condensation. The hydrolysis reaction and the condensation reaction can be carried out continuously in the presence of water and a catalyst with heating and stirring. The amount of water to be used for these reactions, although not limited specifically, is preferably at least about 0.1 mole per mole of alkoxyl. With less than about 0.1 mole of water present, the two compounds are likely to become lower in reactivity. It is most preferable to use a large excess of water. In the case where the condensation reaction produces an alcohol which is sparingly soluble in water, the use of water and a water-soluble organic solvent in combination serves to render the reaction system uniform. Desirable for use as water-soluble organic solvents are the aforementioned alcoholic, ester, ether and ketone solvents. Acids or alkali catalysts are usable as catalysts for the hydrolysis reaction. Examples of useful acid catalysts are hydrochloric acid, sulfuric acid, phosphoric acid, formic acid, acetic acid, propionic acid, acrylic acid, methacrylic acid and the like. Examples of useful alkali catalysts are sodium hydroxide, triethylamine, ammonia and the like. It is suitable to use the catalyst in an amount of about 0.0001 to about 5 wt. %, preferably about 0.01 to about 0.1 wt. %, based on the combined amount of the compounds (A) and (B).

The polysiloxane macromonomer to be used in this invention is about 400 to about 100000, preferably about 1000 to about 20000, in number average molecular weight. If this value is less than about 400, the copolymerization reaction system tends to gel, whereas values exceeding about 100000 is likely to result in impaired compatibility, hence undesirable.

The main skeleton of the polysiloxane macromonomer afforded by the reaction of the compounds (A) and (B) in the present invention comprises a siloxane bond. The main skeleton primarily has a linear structure, ladder structure or a structure in the form of a combination of these structures. It is desirable to use a macromonomer of ladder structure, or a macromonomer of combination structure having a larger proportion of ladder structure, from the viewpoint of resistance to water, heat and light. The structure of the macromonomer can be selectively determined as desired according to the ratio between the compound (A) and the compound (B), the amounts of water and acid catalyst, etc. The polysiloxane macromonomer has a structure wherein the Si of the siloxane bond has attached thereto groups such as $R_1$ to $R_4$, $R_6$ to $R_8$, a group of the formula

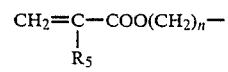

or the like. The macromonomer has as attached to the Si at least two functional groups per molecule which groups are selected from hydroxyl and alkoxyl. These groups form a silanol group or alkoxysilane group.

It is further desired that the polysiloxane macromonomer have on the average about 0.2 to about 1.9, preferably about 0.6 to about 1.4, more preferably about 0.9 to about 1.2, polymerizable unsaturated bonds. With a very small quantity of polymerizable unsaturated bonds present, the copolymerization reaction product is liable to become turbid, whereas when having an excess of such bonds, the macromonomer is likely to gel during the reaction, hence undesirable.

The number of unsaturated bonds in the macromonomer can be determined by the following method.

(1) Various polysiloxane macromonomers are prepared by reacting the compound (A) with the compound (B) in suitably varying ratios.

(2) A nonfunctional vinyl monomer is reacted with the macromonomer in varying ratios to obtain various vinyl copolymers. The nonfunctional vinyl monomer to be used is a vinyl monomer which has a polymerizable unsaturated bond portion as a portion reactive with the unsaturated bond in the macromonomer and which has no functional group reactive with the alkoxysilane group and/or the silanol group in the macromonomer. Examples of nonfunctional vinyl monomers which can be used are styrene, vinyltoluene, an ester of acrylic acid or methacrylic acid with a monovalent alcohol, and the like.

(3) The molecular weight distributions of the resulting vinyl copolymers are determined by gel permeation chromatography (G.P.C.).

(4) When the copolymers obtained using the macromonomer and the nonfunctional vinyl monomer in varying ratios are approximately identical in peak molecular weight (molecular weight for the highest content) and have a distribution curve with a single peak, free from low-molecular-weight components (macromonomers free from unsaturated bond) or high-molecular-weight components (copolymers of macromonomers having at least two unsaturated bonds), the macronomer used can then be interpreted as having one polymerizable unsaturated bond per molecule on the average.

(5) The average number of polymerizable unsaturated bonds in the other macromonomers can be given by $$\frac{[B]/[A]}{[B_1]/[A_1]}$$

wherein [A] is the mole number of the compound (A) used, B]is the mole number of the compound (B) used, and [Al] and [B₁] are the mole numbers of the compound (A) and the compound (B), respectively, used for giving the macromonomer having one polymerizable unsaturated bond on the average.

For example, it is assumed the molar ratio of compound (B)/compound (A)=1/20 affords a macromonomer having one polymerizable unsaturated bond. The molar ratio of compound (B)/compound (A)=0.9/20 then gives a macromonomer having 0.9 polymerizable unsaturated bond on the average.

When the polymer (X) is a copolymer of the macromonomer with other α,β-ethylenically unsaturated monomer, the unsaturated monomer can be selected from a wide variety of monomers in accordance with the desired properties. Typical examples of such unsaturated monomers are as follows.

(a) Esters of acrylic acid or methacrylic acid $C_1$ to C18 alkyl esters of acrylic acid or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; $C_2$ to $C_{18}$ alkoxyalkyl esters of acrylic acid or methacrylic acid such as methoxybutyl acrylate, methoxybutyl methacrylate, methoxyethyl acrylate, methoxyethyl methacrylate, ethoxybutyl acrylate and ethoxybutyl methacrylate; $C_2$ to $C_8$ alkenyl esters of acrylic acid or methacrylic acid such as allyl acrylate and allyl methacrylate; $C_2$ to $C_8$ hydroxyalkyl esters of acrylic acid or methacrylic acid such as hydroxyethyl acrylate, hydroxyethyl methacrylate, hydroxypropyl acrylate and hydroxypropyl methacrylate; addition products of the above hydroxyalkyl esters of acrylic acid or methacrylic acid with polycaprolactone; and $C_3$ to $C_{18}$ alkenyloxyalkyl esters of acrylic acid or methacrylic acid such as allyloxyethyl acrylate and allyloxyethyl methacrylate.

(b) Vinyl aromatic compounds

Styrene, α-methylstyrene, vinyltoluene and p-chlorostyrene.

(c) Polyolefinic compounds

Butadiene, isoprene and chloroprene.

(d) Others

Acrylonitrile, methacrylonitrile, methyl isopropenyl ketone, vinyl acetate, Veova monomer (product of Shell Chemical), vinyl propionate, vinyl pivalate, etc.

When the polymer (X) is prepared by copolymerizing the macromonomer with the other α,β-ethylenically unsaturated monomer, the unsaturated monomer is used in an amount of about 5 to about 99 wt. %, preferably about 30 to about 90 wt. % based on resin solids of the copolymer.

For preparing the polymer (X), unsaturated monomers other than the α,β-ethylenically unsaturated monomers exemplified above are further usable as required. Examples of such unsaturated monomers are monocarboxylic acids such as acrylic acid, methacrylic acid, crotonic acid and the like: dicarboxylic acids such as fumaric acid, maleic acid, itaconic acid and the like; anhydride thereof; monoesters of the dicarbonic acid anhydride. The monocarboxylic acid can be used in an amount of less than about 10 wt. % and the other monomers can be used in an amount of less than about 5 wt. %, based on resin solids of the copolymer.

The polymer (Y) to be used in the present invention is a homopolymer of the alkoxysilane-containing vinyl monomer represented by the formula

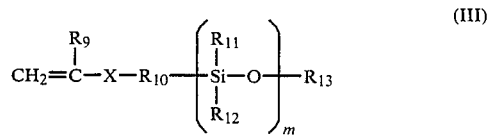

(III)

wherein X, $R_9$, $R_{10}$, $R_{11}$, $R_{12}$, $R_{13}$ and m are as defined above or a copolymer of the alkoxysilane-containing vinyl monomer with other α,β-ethylenically unsaturated monomer.

With reference to the formula (III), the bivalent saturated aliphatic hydrocarbon having 1 to 6 carbon atoms and represented by $R_{10}$ is a straight-chain or branched-chain alkylene group, such as methylene, ethylene, propylene, 1,2-butylene, 1,3-butylene, 2,3-butylene, tetramethylene, pentamethylene, hexamethylene or the like. The alkyl group represented by $R_{11}$, $R_{12}$ and $R_{13}$ and having 1 to 6 carbon atoms is a straight-chain or branched-chain alkyl group, such as methyl, ethyl, n-propyl, isopropyl, n-butyl, isobutyl, sec-butyl, tertbutyl, n-pentyl, isopentyl, neopentyl, n-hexyl, isohexyl or the like. The alkoxyl group represented by $R_{11}$ and $R_{12}$ and having 1 to 6 carbon atoms is a straight-chain or branched-chain alkoxyl group, such as methoxy, ethoxy, n-propoxy, isopropoxy, n-butoxy, isobutoxy, sec-butoxy, tert-butoxy, n-pentoxy, isopentoxy, n-hexyloxy, isohexyloxy or the like. When m in the formula (III) is at least 2, the groups $R_{11}$, as well as groups $R_{12}$, may be the same or different.

Of the compounds of the formula (III) for use in the invention, those wherein X is

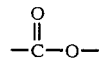

are, for example, β-(meth)acryloxyethyltrimethoxysilane, γ-(meth)acryloxypropyltrimethoxysilane, γ-(meth)acryloxypropyltriethoxysilane, γ-(meth)acryloxypropyltripropoxysilane, γ-(meth)acryloxypropylmethyldimethoxysilane, γ-(meth)-acryloxypropylmethylproproxysilane, γ-(meth)acryloxybutylphenyldimethoxysilane, γ-(meth)acryloxybutylphenyldiethoxysilane, γ-(meth)acryloxybutylphenyldipropoxysilane, γ-(meth)acryloxypropyldimethylmethoxysilane, γ-(methy)acryloxypropyldimethylethoxysilane, γ-(meth)-acryloxypropylphenylmethylmethoxysilane, γ-(meth)-acryloxypropylphenylmethylethoxysilane,

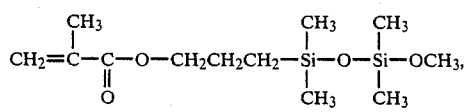
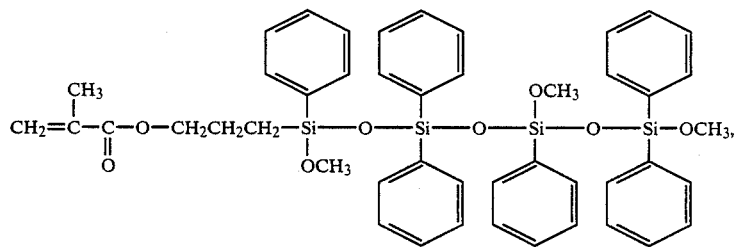
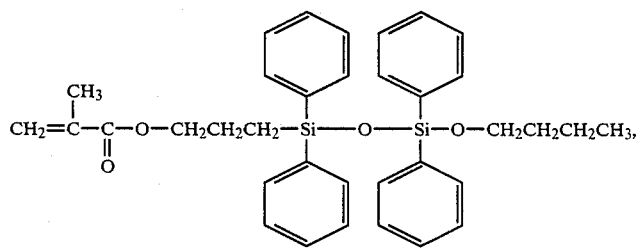
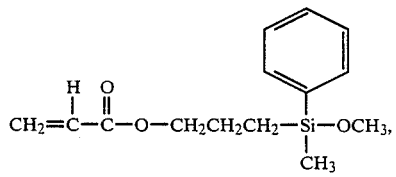
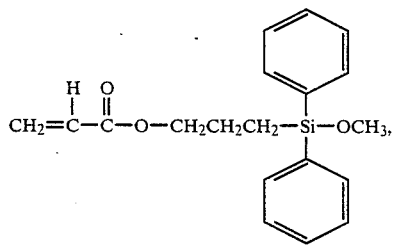
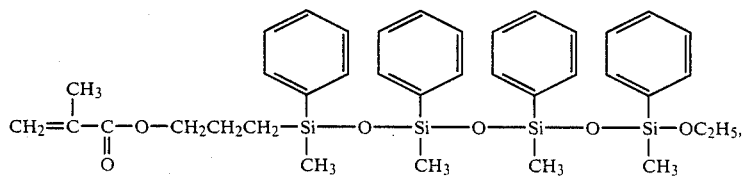
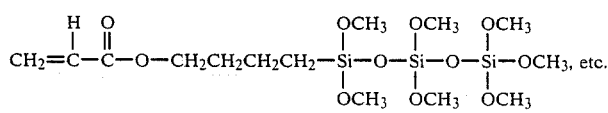
Further of compounds of the formula (III), those wherein X is
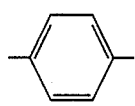
are, for example,
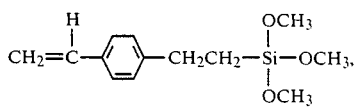
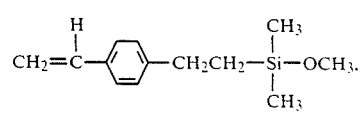

-continued

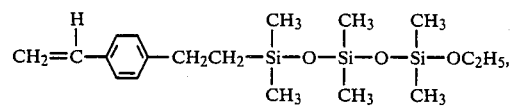

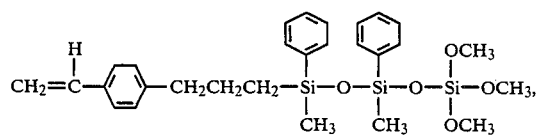

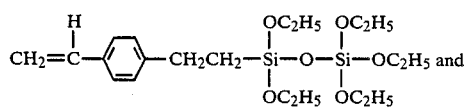

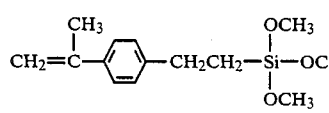

Other α,β-ethylenically unsaturated monomers which are used for preparing the polymer (Y) when so required are suitably selectable according to the properties required of the coatings. Examples of the unsaturated monomers are those exemplified for the polymer (X).

The proportion of the alkoxysilane-containing vinyl monomer to be used for preparing the polymer (Y) is usually about 0.02 to about 100 wt. %, preferably about 0.2 to about 80 wt. % based on the combined amount of monomers used. Proportions of less than 0.02 wt. % are undesirable since the composition will then exhibit lower curability.

The polymer (Z) to be used in the present invention is a homopolymer of the epoxy-containing vinyl monomer or a copolymer of the epoxy-containing vinyl monomer with other α,β-ethylenically unsaturated monomer. The α,β-ethylenically unsaturated monomer is suitably selectable according to the properties required of the coating. Examples of the unsaturated monomers are those exemplified for the polymer (X).

Examples of preferred epoxy-containing vinyl monomers are alicyclic epoxy-containing vinyl monomers represented by the following formulae (IV) to (XVIII).

It is more desirable to use acrylic or methacrylic acid esters containing an alicyclic epoxy group, such as those represented by the following formulae (IV) to (XV).

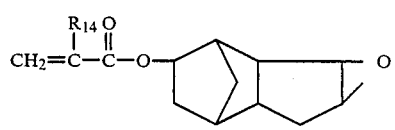 (IV)

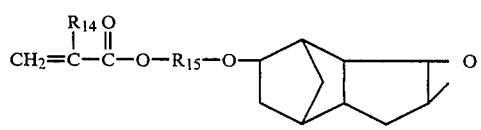 (V)

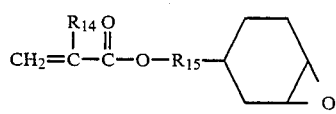 (VI)

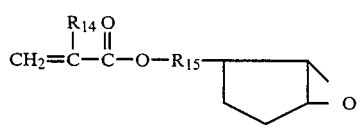 (VII)

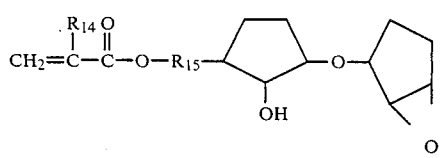 (VIII)

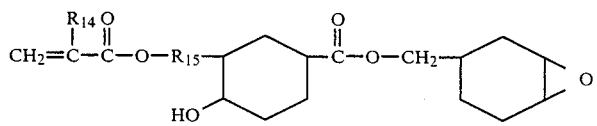 (IX)

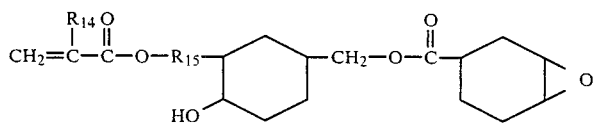 (X)

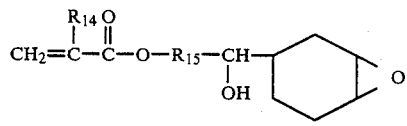 (XI)

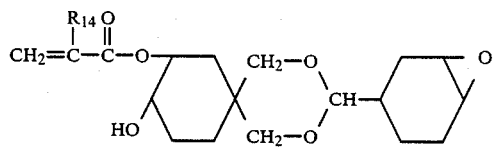 (XII)

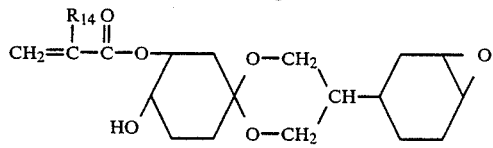 (XIII)

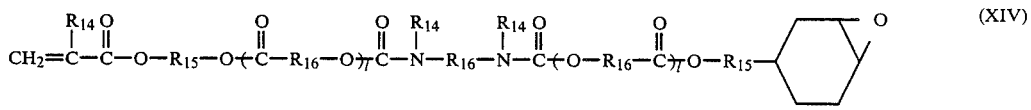 (XIV)

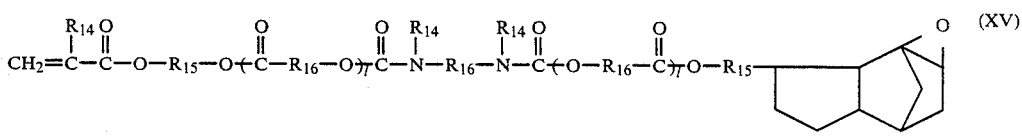 (XV)

(XVI)

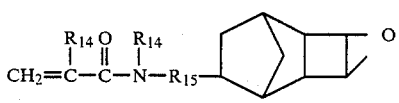

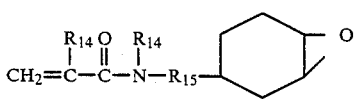 (XVII)

(XVIII)

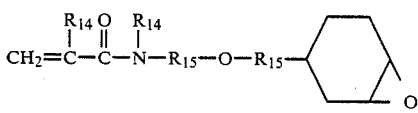

In the above formulae, $R_{14}$ is a hydrogen atom or methyl and the $R_{14}$ groups are the same or different, $R_{15}$ is a bivalent aliphatic saturated hydrocarbon group having 1 to 6 carbon atoms and the $R_{15}$ groups are the same or different, $R_{16}$ is a bivalent hydrocarbon group having 1 to 10 carbon atoms and the $R_{16}$ groups are the same or different, and l is an integer of from 0 to 10.

Examples of bivalent aliphatic saturated hydrocarbon groups $R_{15}$ having 1 to 6 carbons are methylene, ethylene, propylene, tetramethylene, ethylethylene, pentamethylene, hexamethylene and the like which are straight chain or branched chain alkylene groups. Examples of bivalent hydrocarbon groups $R_{16}$ having 1 to 10 carbon atoms are methylene, ethylene, propylene, tetramethylene, ethylethylene, pentamethylene, hexamethylene, polymethylene, phenylene,

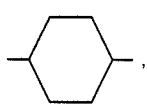

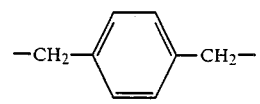

and the like.

A vinyl monomer represented by the formula

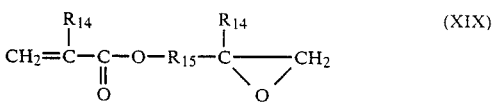 (XIX)

wherein $R_{14}$ and $R_{15}$ are as defined above can be also used as the epoxy-containing vinyl monomer.

The alicyclic epoxy-containing vinyl monomers represented by the formulae (IV) to (XVIII) are desirable in view of curability. Since the epoxy group in the alicyclic epoxy-containing vinyl monomer has a high reactivity in the ring opening-polymerization, the composition containing such group is cured in a short time and provides a cured product which is excellent in properties.

The proportion of the epoxy-containing vinyl monomer to be used for preparing polymer (Z) is usually about 3 to about 100 wt. %, preferably about 20 to about 100 wt. % based on the combined amount of monomers used. Proportions of less than 3 wt. % are undesirable since the composition exhibits lower curability.

The present composition comprises as a resin component a polymer mixture of the polymer (X) or the polymer (Y) with the polymer (Z). Based on the combined amount of polymers used, the proportion of the polymer (X) or the polymer (Y) is about 5 to about 95 wt. %, and the proportion of the polymer (Z) is about 95 to about 5 wt. %. When the proportion of the former is less than 5 wt. % (with that of the latter exceeding 95 wt. %), reduced curability tends to result, whereas the proportions of the former exceeding 95 wt. % (with less than 5 wt. % of the latter) are undesirable since the cured product then exhibits impaired properties and is liable to shrinkage.

The polymers (X), (Y) and (Z) can be prepared by the same process and under the same conditions as usually used for preparing acrylic resins or vinyl resins. For example, the polymer can be prepared by dissolving or dispersing the monomer components in an organic solvent and heating the solution or dispersion at a temperature of about 60 to 180° C. with stirring in the presence of a radical polymerization initiator. The reaction is conducted usually for about 1 to about 10 hours. Examples of useful organic solvents are those exemplified already, including alcohol solvents, ether solvents, ester solvents, hydrocarbon solvents and the like. The hydrocarbon solvent, when to be used, is used preferably in combination with other solvents in view of solubility. The radical polymerization initiator can be any of those generally used. Examples of such initiators are benzoyl peroxide, t-butylperoxy-2-ethyl hexanoate and like peroxides, azobisisobutyronitrile, azobisdimethylvaleronitrile and like azo compounds.

Preferably, each of the polymers (X), (Y) and (Z) is about 3000 to about 200000, more preferably about 10000 to about 80000, in number average molecular weight.

The chelate compound for use in the invention is at least one compound selected from the group consisting of aluminum chelate compounds, titanium chelate compounds and zirconium chelate compounds. Of these chelate compounds, more preferable are those containing a compound capable of forming a keto-enol tautomer, as ligands forming a stable chelate ring.

Examples of useful compounds capable of forming a keto-enol tautomer are β-diketones (such as acetylacetone), acetoacetic acid esters (such as methyl acetoacetate), malonic esters (such as ethyl malonate), ketones having hydroxyl in the β-position (such as diacetone alcohol), aldehydes having hydroxyl in the β-position (such as salicylaldehyde), esters having hydroxyl in the β-position (such as methyl salicylate), etc. Especially preferred results can be achieved when acetoacetates and β-diketones are used.

The aluminum chelate compound can be prepared advantageously, for example, by admixing the compound capable of forming a keto-enol tautomer with an aluminum alcoholate represented by the formula

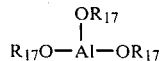
(XX)

wherein $R_{17}$ represents alkyl having 1 to 20 carbon atoms or alkenyl and the $R_{17}$ groups are the same or different, usually in the ratio of about 1 to about 3 moles of the former per mole of the latter, and heating the mixture when required.

Examples of alkyl groups having 1 to 20 carbon atoms are the aforementioned alkyl groups having 1 to 10 carbon atoms, undecyl, dodecyl, tridecyl, tetradecyl, octadecyl and the like. Examples of alkenyl groups are vinyl, allyl and the like.

Examples of aluminum alcoholates represented by the formula (XX) are aluminum trimethoxide, aluminum triethoxide, aluminum tri-n-propoxide, aluminum triisopropoxide, aluminum tri-n-butoxide, aluminum triisobutoxide, aluminum tri-sec-butoxide, aluminum tri-tert-butoxide, etc. It is especially desirable to use aluminum triisopropoxide, aluminum tri-sec-butoxide and aluminum tri-n-butoxide.

The titanium chelate compound can be prepared advantageously, for example, by admixing the compound capable of forming a keto-enol tautomer with a titanate represented by the formula

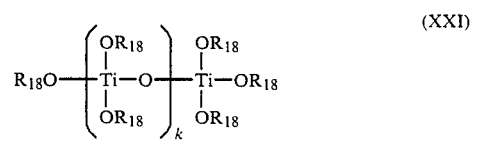
(XXI)

wherein k is an integer of 0 to 10, and $R_{18}$ represents alkyl having 1 to 20 carbon atoms or alkenyl and the $R_{18}$ groups are the same or different, usually in the ratio of about 1 to about 4 moles of the former per mole of the Ti in the titanate, followed by heating when required. Examples of alkyl groups having 1 to 20 carbon atoms and alkenyl groups are the same as those given above.

Examples of titanates represented by the formula (XXI) wherein k is 0 are tetramethyl titanate, tetraethyl titanate, tetra-n-propyl titanate, tetraisopropyl titanate, tetra-n-butyl titanate, tetraisobutyl titanate, tetra-tert-butyl titanate, tetra-n-pentyl titanate, tetra-n-hexyl titanate, tetraisooctyl titanate, tetra-n-lauryl titanate and the like. Favorable results can be obtained by using tetraisopropyl titanate, tetra-n-butyl titanate, tetraisobutyl titanate and tetra-tert-butyl titanate. Of the titanates wherein k is 1 or greater, the dimers to hendecamers (k = 1 to 10 in the formula (XXI)) of tetraisopropyl titanate, tetra-n-butyl titanate, tetraisobutyl titanate and tetra-tert-butyl titanate achieve good results.

The zirconium chelate compound can be prepared favorably, for example, by admixing the compound capable of forming a keto-enol tautomer with a zirconate represented by the formula

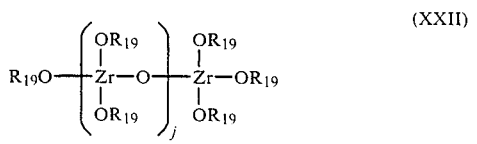
(XXII)

wherein j is an integer of 0 to 10, and $R_{19}$ represents alkyl having 1 to 20 carbon atoms or alkenyl and the $R_{19}$ groups are the same or different, usually in the ratio of about 1 to about 4 moles of the former per mole of the Zr in the zirconate, followed by heating when required.

Examples of alkyl groups with 1 to 20 carbon atoms and alkenyl groups are the same as those exemplified above.

Examples of zirconates represented by the formula (XXII) wherein j is 0 are tetraethyl zirconate, tetra-n-propyl zirconate, tetraisopropyl zirconate, tetra-n-butyl zirconate, tetra-sec-butyl zirconate, tetra-tertbutyl zirconate, tetra-n-pentyl zirconate, tetra-tertpentyl zirconate, tetra-tert-hexyl zirconate, tetra-n-heptyl zirconate, tetra-n-octyl zirconate, tetra-n-stearyl zirconate and the like. Especially good result can be obtained with use of tetraisopropyl zirconate, tetra-n-propyl zirconate, tetraisobutyl zirconate, tetra-n-butyl zirconate, tetra-sec-butyl zirconate and tetra-tert-butyl zirconate. Of the zirconates wherein j is 1 or greater, the dimers to hendecamers (j=1 to 10 in the formula (XXII) of tetraisopropyl zirconate, tetra-n-propyl zirconate, tetra-n-butyl zirconate, tetraisobutyl zirconate, tetra-sec-butyl zirconate and tetra-tert-butyl zirconate give good results. The chelate compound may contain structural units wherein such zirconates are associated with each other.

Examples of especially preferred chelate compounds for use in the invention are aluminum chelate compounds such as diisopropoxy ethylacetoacetate aluminum, tris(ethylacetoacetate)aluminum, tris(n-propylacetoacetate)aluminum, tris(iso-propylacetoacetate)aluminum, tris(n-butylacetoacetate)aluminum, isopropoxy bis(ethylacetoacetate)aluminum, isopropoxy bis(propionylacetonato)aluminum, tris-(acetylacetonato)aluminum, tris(-propylacetoacetate)aluminum, tris(propionylacetonato)aluminum, acetylacetonato bis(ethylacetoacetate)aluminum, ethylacetoacetate bis(acetylacetonato)aluminum, tris(isopropionylacetonato)aluminum, tris(sec-butyrylacetonato)aluminum, [bis(isopropionylacetonato)secbutyrylacetonato]aluminum and tris(butylacetoacetate)aluminum; titanium chelate compounds such as diisopropoxybis(ethylacetoacetate)titanate, diisopropoxy-bis(acetylacetonato)titanate and isopropoxy-tris(propionylacetonato)titanate; and zirconium chelate compounds such as tetrakis(acetylacetonato)zirconium, tetrakis(n-propylacetoacetate)zirconium, tetrakis(propionylacetonato)zirconium and tetrakis(ethylacetoacetate)zirconium.

With the present invention, one of the above chelate compounds is used, or a suitable combination of at least two of them may be used as the crosslinking curing agent. It is suitable to use about 0.01 to about 30 parts by weight of the chelate compound per 100 parts by weight of the polymer mixture calculated as solids. When the proportion is less than this range, there is a tendency toward lower crosslinking curability, whereas when proportions exceed the range, the agent partially remains in the cured product, exhibiting a lower resistance to water, hence undesirable. The proportion of the chelate compound is preferably about 0.1 to about 10 parts by weight, preferably about 1 to about 5 parts by weight, for 100 parts by weight of the polymer mixture.

When required, extender pigments, coloring pigments, dyes, the compounds capable of forming a keto-enol tautomer shown above, etc. can be added to the curable compositions of the invention.

Further, when required, it is possible to use mono- or poly-functional epoxy compounds; low molecular silane compounds such as triphenyl methoxysilane and diphenyl dimethoxysilane; other resins such as conventional silicone resins containing alkoxysilane group; and the like, as blended with the composition.

The curable composition of the invention can be used favorably, for example, as coating compositions, adhesives, inks, etc.

The present curable composition may be used in the form of a solution in an organic solvent as prepared in advance or immediately before use. Although not limitative, preferred organic solvents are those up to about 150° C. in boiling point in view of the curing velocity of the composition. Examples of preferable organic solvents are hydrocarbon solvents such as toluene and xylene, ketone solvents such as methyl ethyl ketone and methyl isobutyl ketone, ester solvents such as ethyl acetate and butyl acetate, ether solvents such as dioxane and ethylene glycol diethyl ether, alcoholic solvents such as butanol and propanol, etc. These solvents can be used singly or in a suitable combination. When alcoholic solvents are used, it is desirable to use them in combination with other solvent in view of the solubility of the resin. The resin content in the resin solution, although variable according to the contemplated use, is generally about 10 to about 70 wt. %.

The method of applying the present composition is not limited specifically but can be any of usual coating methods such as spray coating, roll coating and brush coating.

The curable composition of the present invention is readily curable through crosslinking at low temperatures of up to about 100° C. For example, the composition can be fully cured at room temperature without any heating usually in about 8 hours to about 7 days. When heated at about 40 to about 100° C., the composition can be completely cured in about 5 minutes to about 3 hours.

The curing reaction proceeds in the presence of a small amount of water, e.g. the moisture in air. Water may be added to the composition before application, usually in an amount of about 0.1 to about 1 wt. % based on the composition.

The curing reaction of the present composition starts with the evaporation of the solvent and is thought to proceed in the fashion of a chain reaction by virtue of the vaporization of the chelating agent from the crosslinking agent. Presumably, the crosslinking agent causes the reaction to proceed through the following mechanism. For example, when the crosslinking curing agent used is an organoaluminum chelating compound, the vaporization of the chelating agent is followed by the reaction of the organoaluminum compound with the silanol group derived from the polysiloxane macromonomer to produce the bond

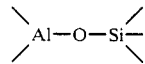

in the first stage.

Subsequently in the second stage, a coordination bond is formed between silanol and

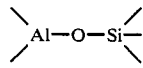

in the form of

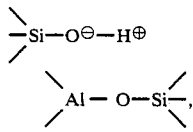

whereby the silanol is polarized. The polarized silanol reacts with an epoxy group, forming an oxonium salt as represented by

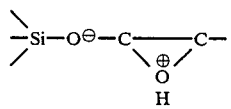

Subsequently, the ionic polymerization of epoxy groups and the addition reaction thereof with hydroxyl groups occur.

In the case of the present composition, the resin components contain silanol groups derived from the polymer (X) or the polymer (Y), epoxy groups derived from the polymer (Z), and other functional groups. Accordingly, besides the crosslinking reaction catalytically effected by the crosslinking curing agent as stated above, presumably various curing reactions take place concurrently, as given below.

(A) Condensation of silanol groups.

(B) Condensation of silanol groups with hydroxyl groups
   from epoxy groups.

(C) Addition of silanol groups to epoxy groups.

(D) Addition of hydroxyl groups to epoxy groups.

(E) Ion polymerization of epoxy groups.

With these curing reactions occurring concurrently, the present composition can be cured at the surface and in the interior almost at the same time. This diminishes the difference in the degree of curing between the surface and the interior of the cured product, which therefore has sufficient hardness and is almost free of shrinkage.

When the resin components in the present composition contain alkoxyl groups which form alkoxysilane groups, the composition requires hydrolysis to form silanol groups. This hydrolysis reaction proceeds satisfactorily in the presence of a small amount of water, e.g. the moisture of air. The hydrolysis reaction will not readily proceed in the interior of the composition, and if the resin components has no silanol group, it is difficult to effect in the interior of the composition the curing reaction wherein the silanol group participates, whereas the interior portion can be fully cured by the reaction wherein epoxy groups participates.

The resin composition of the invention has the outstanding features given below.

(1) The composition can be readily cured by crosslinking at low temperatures of up to about 100° C. For example, when cured at 80° C. for 30 minutes, the composition gives a cured product having a gel fraction of at least 95%.

(2) The curing reaction requires no water or proceeds in the presence of a small quantity of water, e.g. the moisture in air.

(3) The composition starts curing with the vaporization of the solvent and can therefore be stored with good stability even as a single-package composition when sealed off.

(4) The composition is free from any curing agent, such as isocyanate, which is highly toxic.

(5) The condensation reaction of silanol groups, the ion polymerization of epoxy groups and other curing reactions occur concurrently, consequently diminishing the difference in the degree of curing between the surface and the interior, causing no shrinkage and rendering the composition satisfactorily usable for producing coatings of increased thickness.

(6) The composition affords cured products having excellent properties, especially high resistance to weather and water, because of reduced amounts of by-products due to the curing reaction.

(7) The composition has little or no likelihood of remaining uncured in the surface layer when cured, is excellent in overcoatability and recoatability and provides cured products which are outstanding in adhesion, resistance to heat, corrosion and staining, water repellency, flexibility, etc.

Because of these excellent features, the present composition is advantageously usable for coating motor vehicles, containers, outdoor building materials, PCM (precoat metal), etc.

The invention will be described below in greater detail with reference to the following preparation examples, examples and comparison examples in which the parts and percentages are all by weight unless otherwise specified.

1. Preparation of Polymer (X)

Preparation Example X-1

| Methyltrimethoxysilane | 2720 parts |
| γ-Methacryloxypropyl-trimethoxysilane- | 256 parts |
| Deionized water | 1134 parts |
| 60% Hydrochloric acid | 2 parts |
| Hydroquinone | 1 part |

The mixture of these compounds was reacted at 80° C. for 5 hours, and the resulting polysiloxane macromonomer was separated off. The macromonomer was 2000 in number average molecular weight and had one vinyl group (polymerizable unsaturated bond) and four hydroxyl groups per molecule on the average.

The macromonomer (300 parts) was mixed with the following compounds.

| Styrene | 100 parts |
| n-Butyl acrylate | 600 parts |
| Azobisisobutyronitrile | 20 parts |

At 120° C., the mixture was added dropwise to parts of xylene and subjected to polymerization to obtain a transparent copolymer (X-1), which was about in number average molecular weight.

Preparation Example X-2

| | |
|---|---|
| Phenyltrisilanol | 7800 parts |
| γ-Acryloxypropyltrisilanol | 200 parts |
| Toluene | 4500 parts |

The mixture of these compounds was reacted at 117° C. for 3 hours, followed by dehydration to separate off the resulting polysiloxane macromonomer. This macromonomer was 7000 in number average molecular weight and had one vinyl group and 5 to 10 hydroxyl groups per molecule on the average.

The macromonomer (100 parts) was mixed with the following compounds.

| | |
|---|---|
| 2-Hydroxyethyl acrylate | 100 parts |
| n-Butyl methacrylate | 200 parts |
| 2-Ethylhexyl methacrylate | 600 parts |
| Azobisisobutyronitrile | 10 parts |

The mixture was added dropwise to 1000 parts of butanol-xylene mixture (1:1 by weight) at 120° C. for polymerization to obtain a transparent copolymer (X-2), which was about 40000 in number average molecular weight.

Preparation Example X-3

Phenyltrimethoxysilane (48 mols) was reacted with 2 moles of Y-methacryloxyethyltriethoxysilane in the same manner as in Preparation Example X-1. The polysiloxane macromonomer obtained was about 5000 in number average molecular weight and had one vinyl group and 5 to 10 methoxy groups per molecule on the average. The macromonomer (500 parts) was polymerized with 500 parts of vinyl monomers used in Preparation Example X-1 in the same manner as in Preparation Example The copolymer (x-3) obtained was about 60000 in number average molecular weight.

Preparation Example X-4

Methyltrimethoxysilane (29.1 mols) was reacted with 0.9 mol of Y-acryloxyethyltriethoxysilane in the same manner as in Preparation Example X-1. The resulting polysiloxane macromonomer was about 15000 in number average molecular weight and had one vinyl group and 5 to methoxy groups per molecule on the average. This macromonomer (400 parts) was polymerized with 600 parts of vinyl monomers used in Preparation Example X-1 in the same manner as in Preparation Example The copolymer (X-4) obtained was about 70000 in number average molecular weight.

2. Preparation of Polymer (Y)

Preparation Example Y-1

Butyl acetate (100 parts) was heated to 100° C., and the monomers and polymerization initiator given below were added dropwise to the butyl acetate over a period of hours. The mixture was thereafter aged for 5 hours at the same temperature.

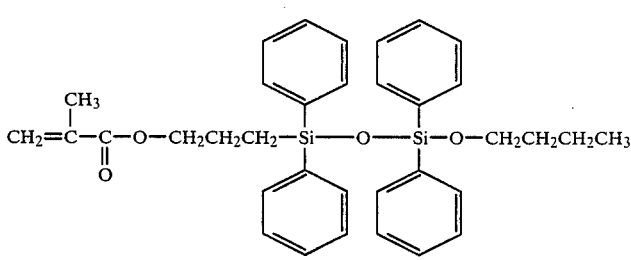

30 parts

| | |
|---|---|
| n-Butyl acrylate | 70 parts |
| Azobisisobutyronitrile | 1 part |

The reaction gave a copolymer (Y-1) which was in solids and about 35000 in number average molecular

Preparation Example Y-2

A solvent mixture (25 parts of naphtha and 25 parts of butanol) was heated to 100° C., and the monomers and polymerization initiator given below were added dropwise to the solvent mixture over a period of 3 hours. The mixture was thereafter aged for 5 hours at the same temperature.

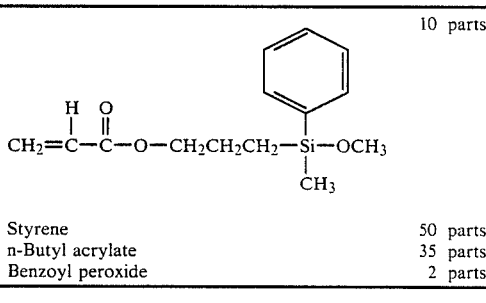

10 parts

| | |
|---|---|
| Styrene | 50 parts |
| n-Butyl acrylate | 35 parts |
| Benzoyl peroxide | 2 parts |

The reaction gave a copolymer (Y-2) which was 66% in solids and about 15000 in number average molecular weight.

Preparation Example Y-3 n-Butanol (100 parts) was heated to 120° C., and the monomers and polymerization initiator given below were added dropwise to the n-butanol over a period of 3 hours. The mixture was thereafter aged for 5 hours at the same temperature.

| | |
|---|---|
| γ-Methacryloxypropyltrimethoxysilane | 60 parts |
| 2-Hydroxyethyl methacrylate | 10 parts |
| Methyl acrylate | 30 parts |
| tert-Butylperoxy benzoate | 5 parts |

The reaction gave a copolymer (Y-3) which was in solids and about 6500 in number average molecular

Preparation Example Y-4

Toluene (50 parts) was heated to 90° C., and the monomers and polymerization initiator given below were added dropwise to the toluene over a period of 3 hours. The mixture was thereafter aged for 5 hours at the same temperature.

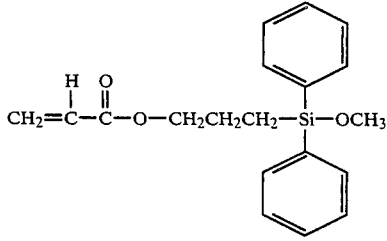

| | |
|---|---|
| | 5 parts |
| n-Butyl methacrylate | 50 parts |
| Ethyl methacrylate | 45 parts |
| Azobisisovaleronitrile | 3 parts |

The reaction gave a copolymer (Y-4) which was in solids and about 25000 in number average molecular

Preparation Example Y-5

A solvent mixture (25 parts of xylene and 25 parts of 2-butoxyethanol) was heated to 100° C., and the monomers and polymerization initiator given below were added dropwise to the solvent mixture over a period of 3 hours. The mixture was thereafter aged for 5 hours at the same temperature.

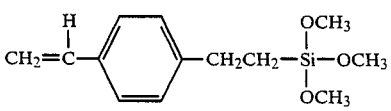

| | |
|---|---|
| | 30 parts |
| 2-Hydroxypropyl acrylate | 10 parts |
| n-Butyl acrylate | 40 parts |
| Methyl methacrylate | 20 parts |
| Benzoyl peroxide | 1 part |

The reaction gave a copolymer (Y-5) which was 66% in solids and about 20000 in number average molecular weight.

3. Preparation of Polymer (Z)

Preparation Example Z-1

Xylene (100 parts) was heated to 120° C., and the monomers and polymerization initiator given below were added dropwise to the xylene over a period of 3 hours. The mixture was thereafter aged for 5 hours at the same temperature.

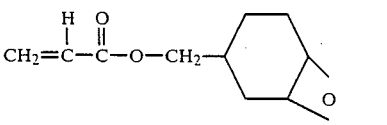

| | |
|---|---|
| | 70 parts |
| n-Butyl acrylate | 30 parts |
| Azobisisobutyronitrile | 5 parts |

The reaction gave a copolymer (Z-1) which was in solids and about 7500 in number average molecular

Preparation Example Z-2

Butyl acetate (100 parts) was heated to 100° C., and the monomers and polymerization initiator given below were added dropwise to the butyl acetate over a period of 3 hours. The mixture was thereafter aged for 5 hours at the same temperature.

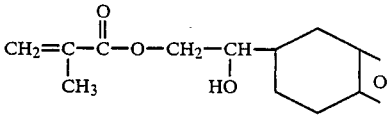

| | |
|---|---|
| | 95 parts |
| n-Butyl methacrylate | 5 parts |
| tert-Butyl peroctoate | 0.5 part |

The reaction gave a copolymer (Z-2) which was 50% in solids and about 40000 in number average molecular weight.

Preparation Example Z-3

Xylene (100 parts) was heated to 120° C., and the monomers and polymerization initiator given below were added dropwise to the xylene over a period of 3 hours. The mixture was thereafter aged for 5 hours at the same temperature.

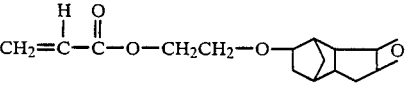

| | |
|---|---|
| | 2 parts |
| Styrene | 30 parts |
| n-Butyl acrylate | 50 parts |
| Methyl methacrylate | 18 parts |
| Azobisiovaleronitrile | 5 parts |

The reaction gave a copolymer (Z-3) which was 50% in solids and about 8000 in number average molecular weight.

Preparation Example Z-4

A solvent mixture (50 parts of xylene and 50 parts of n-butanol) was heated to 80° C., and the monomers and polymerization initiator given below were added dropwise to the solvent mixture over a period of 3 hours. The mixture was thereafter aged for 5 hours at the same temperature.

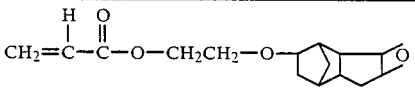

| | |
|---|---|
| | 2 parts |
| Styrene | 30 parts |
| n-Butyl acrylate | 50 parts |
| Methyl methacrylate | 18 parts |
| Azobisisovaleronitrile | 5 parts |

The reaction gave a copolymer (Z-4) which was in solids and about 15000 in number average molecular weight.

Preparation Example Z-5

Toluene (50 parts) was heated to 100° C., and the monomers and polymerization initiator given below were added dropwise to the toluene over a period of 3 hours. The mixture was thereafter aged for 5 hours at the same temperature.

|  | |
|---|---|
| CH$_2$=C(CH$_3$)—C(=O)—O—CH$_2$—CH(—O—)CH$_2$ | 50 parts |
| 2-Hydroxyethyl methacrylate | 15 parts |
| Styrene | 20 parts |
| Butyl methacrylate | 15 parts |
| Azobisisobutyronitrile | 3 parts |

The reaction gave a copolymer (Z-5) which was in solids and about 23000 in number average molecular weight.

Preparation Example Z-6

Toluene (50 parts) was heated to 100° C., and the monomers and polymerization initiator given below were added dropwise to the toluene over a period of 3 hours. The mixture was thereafter aged for 5 hours at the same temperature.

| | |
|---|---|
| 2-Hydroxyethyl methacrylate | 15 parts |
| Styrene | 20 parts |
| Butyl methacrylate | 15 parts |
| Azobisisobutyronitrile | 3 parts |

The reaction gave a copolymer (Z-6) which was 50% in solids and about 22000 in number average molecular weight.

Preparation Example Z-7

Toluene (50 parts) was heated to 110° C., and the monomers and polymerization initiator given below were added dropwise to the toluene over a period of 3 hours. The mixture was thereafter aged for 5 hours at the same temperature.

| | |
|---|---|
| Oxydicyclopentenyl acrylate | 20 parts |
| n-Butyl acrylate | 70 parts |
| 2-Hydroxypropyl acrylate | 10 parts |
| t-Butyl perbenzoate | 1 part |

The reaction gave a copolymer (Z-7) which was 50% in solids and about 30000 in number average molecular weight.

Preparation Example Z-8

A copolymer (Z-8) was prepared in the same manner as in Preparation Example Z-6 except that the alicyclic epoxy-group containing vinyl monomer used in Preparation Example Z-6 was replaced by the same amount of the compound of the formula

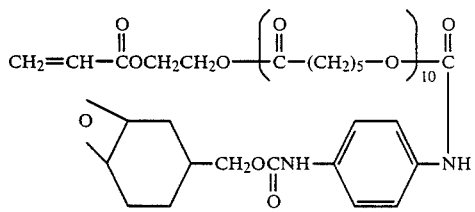

The obtained copolymer was 50% in solids and about 21000 in number average molecular weight.

Preparation Example Z-9

A copolymer (Z-9) was prepared in the same manner as in Preparation Example Z-6 except that the alicyclic epoxy-group containing vinyl monomer used in Preparation Example Z-6 was replaced by the same amount of the compound of the formula

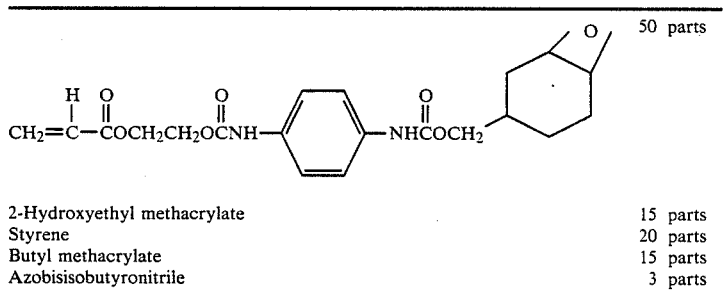

The copolymer (Z-9) was 50% in solids and about 20000 in number average molecular weight.

Examples 1 to 19 and Comparison Examples 1 to 6

The components as shown below in Table 1 were mixed together, giving each curable composition in Examples 1 to 19 and Comparison Examples 1 to 6.

TABLE 1

| Composition | Example | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Copolymer (X) | | | | | | | | | | | | | | | | | |
| Kind | X-1 | X-2 | X-3 | X-4 | X-1 | X-1 | | | | | | | | | | | |
| Amount | 50 | 70 | 50 | 50 | 20 | 90 | | | | | | | | | | | |
| Copolymer (Y) | | | | | | | | | | | | | | | | | |
| Kind | | | | | | | Y-1 | Y-2 | Y-3 | Y-4 | Y-3 | Y-1 | Y-1 | Y-3 | Y-2 | Y-5 | Y-1 |
| Amount | | | | | | | 60 | 70 | 5 | 50 | 50 | 95 | 70 | 70 | 50 | 60 | 60 |
| Copolymer (Z) | | | | | | | | | | | | | | | | | |
| Kind | Z-1 | Z-2 | Z-3 | Z-5 | Z-6 | Z-7 | Z-1 | Z-2 | Z-4 | Z-6 | Z-5 | Z-7 | Z-2 | Z-7 | Z-2 | Z-1 | Z-1 |

TABLE 1-continued

| Amount Chelate compound | 50 | 30 | 50 | 50 | 80 | 10 | 40 | 30 | 95 | 50 | 50 | 5 | 30 | 30 | 50 | 40 | 40 |
|---|---|---|---|---|---|---|---|---|---|---|---|---|---|---|---|---|---|
| Kind* | C-1 | C-2 | C-3 | C-4 | C-1 | C-1 | C-5 | C-6 | C-2 | C-1 | C-1 | C-1 | C-1 | C-1 | C-1 | C-1 | C-7 |
| Amount | 1.5 | 0.2 | 0.5 | 5.0 | 1.5 | 1.0 | 1.5 | 0.5 | 7.5 | 1.0 | 1.0 | 1.0 | 2.0 | 5.0 | 1.0 | 1.5 | 1.5 |

| Composition | Example | | Comparison Example | | | | | |
|---|---|---|---|---|---|---|---|---|
| | 18 | 19 | 1 | 2 | 3 | 4 | 5 | 6 |
| Copolymer (X) | | | | | | | | |
| Kind | | | X-1 | | X-1 | | | X-1 |
| Amount | | | 100 | | 50 | | | 60 |
| Copolymer (Y) | | | | | | | | |
| Kind | Y-4 | Y-4 | | | | | Y-1 | |
| Amount | 50 | 50 | | | | | 100 | |
| Copolymer (Z) | | | | | | | | |
| Kind | Z-8 | Z-9 | | Z-1 | Z-1 | | Z-1 | Z-1 |
| Amount | 50 | 50 | | 100 | 50 | | 100 | 40 |
| Chelate Compound | | | | | | | | |
| Kind* | C-1 | C-1 | C-1 | C-1 | | | C-1 | C-1 |
| Amount | 1.0 | 1.0 | 1.5 | 1.5 | | | 1.5 | 1.5 |

Each composition in Examples 1 to 19 and Comparison Examples 1 to 6 was applied to a test panel to form a film of 100 μm thickness when dried (50 μm thickness for tests for water resistance and weatherability) and the coated panel was cured under the conditions shown below in Table 2. Thereafter the coating film was tested for the following properties by the following methods.

<Appearance>

The appearance of coated panel was observed with the unaided eye and checked for the state of the coating surface (gloss, shrink, crack, etc.).

<Pencil hardness>

The coated panel was checked for scratch hardness using a pencil according to JIS K 5400.

<Gel fraction ratio>

The composition was applied to a glass plate and the coated plate was cured. The separated coating film was added to acetone maintained at a refluxing temperature and was subjected to extraction for 6 hours in Soxhlet's extractor. Thereafter the ratio (%) of residual undissolved film portion was measured.

<Impact resistance>

A mild steel panel was used.

A weight of 500 g was dropped onto the surface of coated panel with use of a Du Pont impact tester. The impact resistance was evaluated in terms of the maximum height (cm) from which the weight was dropped but without any fault in coating film such as crack, peeling and the like.

<Water resistance>

A mild steel panel was used. The coated panel was immersed in water at 40° c for 60 days and then the appearance of the coating surface was checked.

<Weatherability>

An aluminum panel was used.

Weatherability test was conducted using a QUV weather-O-meter (using ultraviolet fluorescent lamp "No.QFS-40, UV-B", wave length of 320 to 280 nm) manufactured by The Q Panel Company. One cycle of test operation was performed under the test conditions of:

| Ultraviolet light irradiation: | 15 min., 70° C. |
|---|---|
| Water condensation: | 15 min., 40° C. |

Each coated panel was checked after 2000 hours. Table 2 below shows the results of the tests.

TABLE 2

| | Example | | | | | | | | | |
|---|---|---|---|---|---|---|---|---|---|---|
| | 1 | 2 | 3 | 4 | 5 | 6 | 7 | 8 | 9 | 10 |
| Appearance | Good | Good | Good | Good | Good | Good | Good | Good | Good | Good |
| Pencil hardness | H | 3H | 2H | F | HB | H | 2H | H | 2H | H |
| Curing condition | | | | | | | | | | |
| Temperature (°C.) | 60 | 100 | 100 | 100 | 25 | 100 | 80 | 60 | 100 | 100 |
| Time | 30 min. | 30 min. | 30 min. | 30 min. | 24 hr. | 30 min. | 30 min. | 40 min. | 30 min. | 30 min. |
| Gel fraction ratio | 92.3 | 97.2 | 95.1 | 90.5 | 90.1 | 96.3 | 98.5 | 97.1 | 99.6 | 95.2 |
| Impact resistance | >50 | >50 | >50 | 50 | 50 | >50 | >50 | >50 | >50 | >50 |
| Water resistance | Good | Good | Good | Good | Good | Good | Good | Good | Good | Good |
| Weatherability | Good | Good | Good | Good | Good | Good | Good | Good | Good | Good |

| | Example | | | | | | | | |
|---|---|---|---|---|---|---|---|---|---|
| | 11 | 12 | 13 | 14 | 15 | 16 | 17 | 18 | 19 |
| Appearance | Good | Good | Good | Good | Good | Good | Good | Good | Good |
| Pencil hardness | HB | H | F | H | 2H | 3H | 2H | H | H |
| Curing condition | | | | | | | | | |
| Temperature (°C.) | 100 | 100 | 25 | 40 | 100 | 100 | 80 | 100 | 100 |
| Time | 30 min. | 30 min. | 2 days | 60 min. | 30 min. | 30 min. | 30 min. | 30 min. | 30 min. |
| Gel fraction ratio | 86.3 | 95.8 | 90.7 | 98.1 | 97.6 | 99.1 | 97.4 | 94.9 | 95.0 |
| Impact resistance | 50 | >50 | >50 | >50 | >50 | >50 | >50 | >50 | >50 |
| Water resistance | Good | Good | Good | Good | Good | Good | Good | Good | Good |
| Weatherability | Good | Good | Good | Good | Good | Good | Good | Good | Good |

TABLE 2-continued

| | Comparison Example | | | | | |
|---|---|---|---|---|---|---|
| | 1 | 2 | 3 | 4 | 5 | 6 |
| Appearance | Shrink | Good | Good | Shrink | Good | Good |
| Pencil hardness | B | Adhesion >6B | Adhesion >6B | B | Adhesion >6B | Adhesion >6B |
| Curing condition | | | | | | |
| Temperature (°C.) | 100 | 100 | 100 | 100 | 100 | 100 |
| Time | 30 min. | 30 min. | 30 min. | 30 min. | 30 min. | 30 min. |
| Gel fraction ratio | 32.4 | 0 | 10 | 32.4 | 0 | 10 |
| Impact resistance | <10 | Not measurable | Not measurable | 10 | Not measurable | Not measurable |
| Water resistance | Blushing, blistering | Not measurable | Not measurable | Blushing, blistering | Not measurable | Not measurable |
| Weatherability | Deluster, crack | Not measurable | Not measurable | Deluster, crack | Not measurable | Not measurable |

We claim:

1. A curable composition characterized in that the composition consists essentially of:
   (i) 100 parts by weight of a polymer mixture consisting essentially of
      (a) about 5 to about 95% by weight of a polymer (X) containing a polysiloxane macromonomer as an essential monomer or a polymer (Y) containing an alkoxysilane-containing vinyl monomer as an essential monomer, and
      (b) about 95 to about 5% by weight of a polymer (Z) containing an epoxy-containing vinyl monomer as an essential monomer,
   the polysiloxane macromonomer being prepared by reacting about 70 to about 99.999 mole % of a compound (A) represented by the formula $$R_1-Si\begin{matrix}R_2\\R_3\\R_4\end{matrix} \qquad (I)$$

wherein $R_1$ is an aliphatic hydrocarbon group having 1 to 8 carbon atoms or phenyl, and $R_2$, $R_3$ and $R_4$ are each alkoxyl having 1 to 4 carbon atoms or hydroxyl with about 30 to about 0.001 mole % of a compound (B) represented by the formula $$CH_2=C-COO(CH_2)_nSi\begin{matrix}R_6\\R_7\\R_8\end{matrix} \qquad (II)$$
$$\phantom{CH_2=}\,|$$
$$\phantom{CH_2=}R_5$$

wherein $R_5$ is a hydrogen atom or methyl, $R_6$, $R_7$ and $R_8$ are each hydroxyl, alkoxyl having 1 to 4 carbon atoms or an aliphatic hydrocarbon group having 1 to 8 carbon atoms, at least one of $R_6$, $R_7$ and $R_8$ being hydroxyl or alkoxyl, and n is an integer of 1 to 6, the polysiloxane macromonomer having per molecule at least two functional groups selected from hydroxyl and alkoxyl and being about 400 to about 100000 in number average molecular weight, the alkoxysilane-containing vinyl monomer being represented by the formula $$CH_2=C-X-R_{10}\left(\begin{matrix}R_{11}\\|\\Si-O\\|\\R_{12}\end{matrix}\right)_m R_{13} \qquad (III)$$
$$\phantom{CH_2=}\,|$$
$$\phantom{CH_2=}R_9$$

wherein X is $$-\overset{O}{\underset{\|}{C}}-O-\text{ or }-\!\!\!\left\langle\!\!\!\bigcirc\!\!\!\right\rangle\!\!\!-,$$

$R_9$ is a hydrogen atom or methyl, $R_{10}$ is a bivalent saturated aliphatic hydrocarbon group having 1 to 6 carbon atoms, $R_{11}$ and $R_{12}$ are the same or different and are each phenyl, alkyl having 1 to 6 carbon atoms or alkoxyl having 1 to 6 carbon atoms, $R_{13}$ is alkyl having 1 to 6 carbon atoms, and m is an integer of from 1 to 10; and
   (ii) about 0.01 to about 30 parts by weight of at least one chelate compound selected from the group consisting of aluminum chelate compound, titanium chelate compound and zirconium chelate compound.

2. The composition as defined in claim 1 wherein the polymer mixture consists of the polymer (X) and the polymer (Z).

3. The composition as defined in claim 1 wherein the polymer mixture consists of the polymer (Y) and the polymer (Z).

4. The composition as defined in claim 2 wherein the compound (A) is at least one compound selected from the group consisting of methyltrimethoxysilane, phenyltrimethoxysilane, butyltrimethoxysilane, methyltriethoxysilane, methyltributoxysilane, phenyltrisilanol and methyltrisilanol.

5. The composition as defined in claim 2 wherein the compound (B) is at least one compound selected from the group consisting of γ-methacryloxypropyltrimethoxysilane, γ-methacryloxypropyltriethoxysilane, γ-acryloxypropyltrimethoxysilane, γ-methacryloxybutyltriethoxysilane, and γ-acryloxypropyltrisilanol.

6. The composition as defined in claim 2 wherein the polysiloxane macromonomer has about 0.2 to about 1.9 polymerizable unsaturated bonds per molecule on the average.

7. The composition as defined in claim 2 wherein the polymer (X) is a homopolymer of the polysiloxane macromonomer or a copolymer of the polysiloxane macromonomer with other α,β-ethylenically unsaturated monomer.

8. The composition as defined in claim 3 wherein the polymer (Y) is a homopolymer of the alkoxysilane-containing vinyl monomer or a copolymer of the alkoxysilane-containing vinyl monomer with other ethylenically unsaturated monomer.

9. The composition as defined in claim 1 wherein the polymer (Z) is a homopolymer of the epoxy-containing vinyl monomer or a copolymer of the epoxy-containing vinyl monomer with other α,β-ethylenically unsaturated monomer.

10. The composition as defined in claim 9 wherein the epoxy-containing vinyl monomer is an alicyclic epoxy-containing vinyl monomer.

11. The composition as defined in claim 1 wherein the chelate compound contains a compound capable of forming a keto-enol tautomer.

12. The composition as defined in claim 1 wherein the chelate compound is at least one compound selected from the group consisting of diisopropoxy ethylacetoacetate aluminum, tris(ethylacetoacetate)aluminum, tris(n-propylacetoacetate)aluminum, tris(isopropylacetoacetate)aluminum, tris(n-butylacetoacetate)aluminum, isopropoxy bis(ethylacetoacetate)aluminum, isopropoxy bis(propionylacetonato)aluminum, tris(acetylacetonato)aluminum, tris(propylacetoacetate)aluminum, tris(propionylacetonato)aluminum, acetylacetonatobis(ethylacetoacetate)aluminum, ethylacetoacetate bis(acetylacetonato)aluminum, tris(isopropionylacetonato)aluminum, tris(sec-butyrylacetonato)aluminum, [bis(isopropionylacetonato)sec-butyrylacetonato]aluminum, tris(butylacetoacetate)aluminum, diisopropoxy-bis(ethylacetoacetate)titanate, isopropoxy-tris(propionylacetonato)titanate, diisopropoxy-bis(acetylacetonato)titanate, tetrakis(acetylacetonato)zirconium, tetrakis(n-propylacetoacetate)zirconium, tetrakis(propionylacetonato)zirconium and tetrakis(ethylacetoacetate)zirconium.

13. The composition as defined in claim 10 wherein the epoxy-containing vinyl monomer is an acrylic or methacrylic acid ester containing an alicyclic epoxy group.

* * * * *